(12) United States Patent
Frerichs et al.

(10) Patent No.: US 6,684,249 B1
(45) Date of Patent: Jan. 27, 2004

(54) METHOD AND SYSTEM FOR ADDING ADVERTISEMENTS OVER STREAMING AUDIO BASED UPON A USER PROFILE OVER A WORLD WIDE AREA NETWORK OF COMPUTERS

(75) Inventors: David J. Frerichs, Mountain View, CA (US); Ian E. McDowall, Woodside, CA (US); Mark T. Bolas, Mountain View, CA (US)

(73) Assignee: Sonicbox, Inc., Mountain View, CA (US)

(*) Notice: Subject to any disclaimer, the term of this patent is extended or adjusted under 35 U.S.C. 154(b) by 0 days.

(21) Appl. No.: 09/579,650

(22) Filed: May 26, 2000

(51) Int. Cl.⁷ .............................................. G06F 15/173
(52) U.S. Cl. ..................... 709/225; 709/203; 709/217; 709/218; 709/219; 709/227; 709/216; 725/32; 725/34; 725/35; 725/42; 725/46; 345/717; 380/200
(58) Field of Search ................................ 709/216–219, 709/203, 227, 225; 725/32, 34–35, 42, 46; 345/717; 380/200

(56) References Cited

U.S. PATENT DOCUMENTS

| | | | |
|---|---|---|---|
| 5,142,528 A | 8/1992 | Kobayashi et al. | 370/79 |
| 5,557,541 A | 9/1996 | Schulhof et al. | 364/514 |
| 5,572,442 A | 11/1996 | Schulhof et al. | 364/514 |
| 5,629,867 A | 5/1997 | Goldman | 364/514 |
| 5,726,909 A | 3/1998 | Krikorian | 364/514 |
| 5,778,187 A | 7/1998 | Monteiro et al. | |
| 5,790,423 A | 8/1998 | Lau et al. | 364/514 |
| 5,809,246 A | 9/1998 | Goldman | 395/200.47 |
| 5,828,839 A | 10/1998 | Moncreiff | 395/200.34 |
| 5,841,979 A | 11/1998 | Schulhof et al. | 395/200.67 |
| 5,859,660 A | 1/1999 | Perkins et al. | |
| 5,892,536 A | 4/1999 | Logan et al. | 348/13 |
| 5,917,830 A | 6/1999 | Chen et al. | |
| 5,922,045 A | 7/1999 | Hanson | 709/206 |
| 5,926,624 A | 7/1999 | Katz et al. | 395/200.47 |
| 5,956,681 A | 9/1999 | Yamakita | 704/260 |
| 6,012,086 A | 1/2000 | Lowell | 709/218 |
| 6,014,569 A | 1/2000 | Bottum | 455/466 |
| 6,088,455 A * | 7/2000 | Logan et al. | 380/200 |
| 6,248,946 B1 | 6/2001 | Dwek | |
| 6,249,810 B1 | 6/2001 | Kiraly | |
| 6,289,207 B1 | 9/2001 | Hudecek et al. | |
| 6,314,094 B1 | 11/2001 | Boys | |
| 6,339,761 B1 | 1/2002 | Cottingham | |
| 6,349,329 B1 | 2/2002 | Mackintosh et al. | |
| 6,351,736 B1 | 2/2002 | Weisberg et al. | |

(List continued on next page.)

OTHER PUBLICATIONS

"The Audible Player and How it Works", www.audible.com, Nov. 12, 1997.
Audioactive Product Brochure, date unknown.
"CD Radio", www.cdradio.com, 1998.
U.S. patent application Ser. No. 08/984,772, 2644, Jonathan Saas, Apparatus for Distributing Audio Information.
Don't Touch that URL, http//.csmweb2.emcweb.com/durable/2000/05/04p11s1.htm, 5 pages.

(List continued on next page.)

*Primary Examiner*—Robert B. Harrell
*Assistant Examiner*—Hien Le
(74) *Attorney, Agent, or Firm*—Townsend and Townsend and Crew LLP

(57) ABSTRACT

A method for inserting advertisements into streaming audio for transmission over a world wide network of computers. The method includes transmitting audio data from a first server location to a client location. The audio data include a flag and audio content data. The method also includes monitoring the audio data and identifying the flag on the audio data. A step of inserting an advertisement, which is based upon a user profile, into the audio data based upon the flag is also included. The method also outputs the audio content data comprising the advertisement.

14 Claims, 10 Drawing Sheets

U.S. PATENT DOCUMENTS

| | | |
|---|---|---|
| 6,381,314 B1 | 4/2002 | Walinski |
| 6,389,463 B2 * | 5/2002 | Bolas et al. ................ 709/219 |
| 6,418,138 B1 | 7/2002 | Cerf et al. |
| 6,463,468 B1 * | 10/2002 | Buch et al. ................ 709/219 |
| 6,496,857 B1 | 12/2002 | Dustin et al. |
| 6,557,028 B2 | 4/2003 | Cragun |
| 2001/0034219 A1 | 10/2001 | Hewitt et al. |
| 2002/0072326 A1 | 6/2002 | Qureshey et al. |

OTHER PUBLICATIONS

Jim Davis, Kerbango launches Web site, plans Net radio appliance, http://news.comcom/2100-1040-231320.html, Oct. 13, 1999, 2 pages.

Winamp v2.60 Nullsoft, Inc., http://www.winamp.com, Feb. 11, 2000, 7 pages.

Shoutcast.com, Oct. 24, 2002, 3 pages.

RealPlayer Plus™ G2 Manual, http://service.real.com/help/player/plus_manual.g2/htmfiles/notice.htm, Oct. 23, 2002, 18 pages.

Yahoo launces digital music endeavor, news.com, Oct. 23, 2002, 3 pages.

* cited by examiner

METHOD AND SYSTEM FOR ADDING ADVERTISEMENTS OVER STREAMING AUDIO BASED UPON A USER PROFILE OVER A WORLD WIDE AREA NETWORK OF COMPUTERS

BACKGROUND OF THE INVENTION

This invention generally relates to techniques for broadcasting information through a wide area network of computers. More particularly, the present invention provides a method and device for inserting a targeted advertisement based upon a user profile through streaming audio. Merely by way of example, the present invention is implemented using a personal computer, but it would be recognized that the invention has a much broader range of applicability. The invention can be applied to other computing devices, such as cellular phones, internet appliances, personal digital assistants, laptop computers, set top boxes, television, and the like.

A long time ago, music could only be heard at a live performance. Here, a performer would stand in front of an audience and sing a piece in a manner to please the audience. "Star Spangled Banner" would echo out to the audience. The live performer could only sing so loud to carry his/her audio signals out to the audience. Only a limited number of people could actually enjoy and listen to the performer at the live performance. One would find the performer in a park or theater singing a musical piece to a limited number of people. Musicians who played instruments could also be heard only at a live performance. Sounds from piano, trumpets, and drums would ring out! The beat of drums! Piano keys! Ring from trumpets sound out!-only as far as the sounds travel through air. Accordingly, only live performances could be used for people to enjoy music.

As time progressed, radio replaced, in part, some aspects of the live performances. Radio uses a wireless transmission and reception of electric impulses or signals by means of electric waves, which travel through air. By way of radio, audio information from sounds or songs would be transmitted from a broadcasting station to numerous radio receiving units, commonly called radios. These radios would tune into one of a plurality of broadcasting stations, which transmitted audio information from the station to each of the radios within a specific geographic region. High school students tuned into stations on a frequency modulated format called "FM" to listed to jazz, rock, country, and pop music. Amplitude modulated formats, commonly called "AM," often transmitted signals more efficiently over longer distances than FM. Since the electronic waves traveled through air, transmission distance was still limited, often to geographical regions.

In the 1990's, computers were coupled to each other through a world wide area network, commonly the Internet. The Internet revolutionized communication throughout the world. These computers began carrying audio information from a source location to a destination or client. Some source locations began transmitting audio information in the form of songs or sounds to destination locations. Unfortunately, most of these source locations failed to provide an easy to use interface device, which allowed users to freely use such audio information. For example, most of these tuners were software based and had to be accessed through the browsing device, which was cumbersome and difficult to use in some conventional devices.

Most of these source were also music content only. That is, music could be played at the client location, but additional information could not be sent from the source location to the destinations. In some examples, where there were additional information, such information was provided into the streaming audio media through manual processing techniques. These manual processing techniques often required conventional editing tools and the like, which were often cumbersome and difficult to perform efficiently.

From the above, it is seen that an improved way to transmit and control radio station information is highly desirable.

SUMMARY OF THE INVENTION

According to the present invention, a technique including a method and device for streaming audio output is provided. More particularly, the invention provides a method and device for inserting targeted advertisement into streaming audio at a client location such as a personal computer. The invention also can be applied to other types of client devices such as personal digital assistants, internet appliances, internet radio, cellular phones, and the like.

In a specific embodiment, the invention provides a method for inserting advertisements into streaming audio for transmission over a world wide network of computers. The method includes transmitting audio data from a first server location to a client location. The method also includes inserting an advertisement into the audio data while simultaneously reducing an audio volume level of the audio data and simultaneously outputting the audio data and the advertisement where an advertisement volume level is selected for a user to hear the advertisement while playing the audio data in a song format as background noise. The advertisement, which is one of a plurality of advertisements, is based upon a user profile to provide a targeted advertisement to the user. The advertisement has been based upon a user profile. The user profile can be derived from a selected channel (e.g., jazz, rock, blues, Japanese, French) and other factors, e.g., geography, user registration information (e.g., sex, age).

In an alternative specific embodiment, the invention provides a system for inserting a targeted advertisement into streaming audio. The system comprises a memory or memories, which includes one or more computer codes for carrying out the functionality described herein. The memory has a code directed to transmitting audio data from a first server location to a client location through a wide area network. The memory also has a code directed to inserting an advertisement into the audio data while simultaneously reducing an audio volume level of the audio data and simultaneously outputting the audio data and the advertisement where an advertisement volume level is selected for a user to hear the advertisement while playing the audio data in a song format as background noise. Other codes can also be available to carry out the functionality described herein.

Many benefits are achieved by way of the present invention over conventional techniques. For example, the present invention can be implemented on conventional hardware in an easy manner in some embodiments. The invention can also be used to provide targeted advertisements and/or messages to a specific client user. In other aspects, the invention allows a user to receive targeted information in an easy and cost effective manner. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

According to the present invention, a technique including a method and device for streaming audio output is provided. More particularly, the invention provides a method and device for inserting targeted advertisement into streaming audio at a client location such as a personal computer. The invention also can be applied to other types of client devices such as personal digital assistants, internet appliances, internet radio, cellular phones, and the like.

Figure 1:
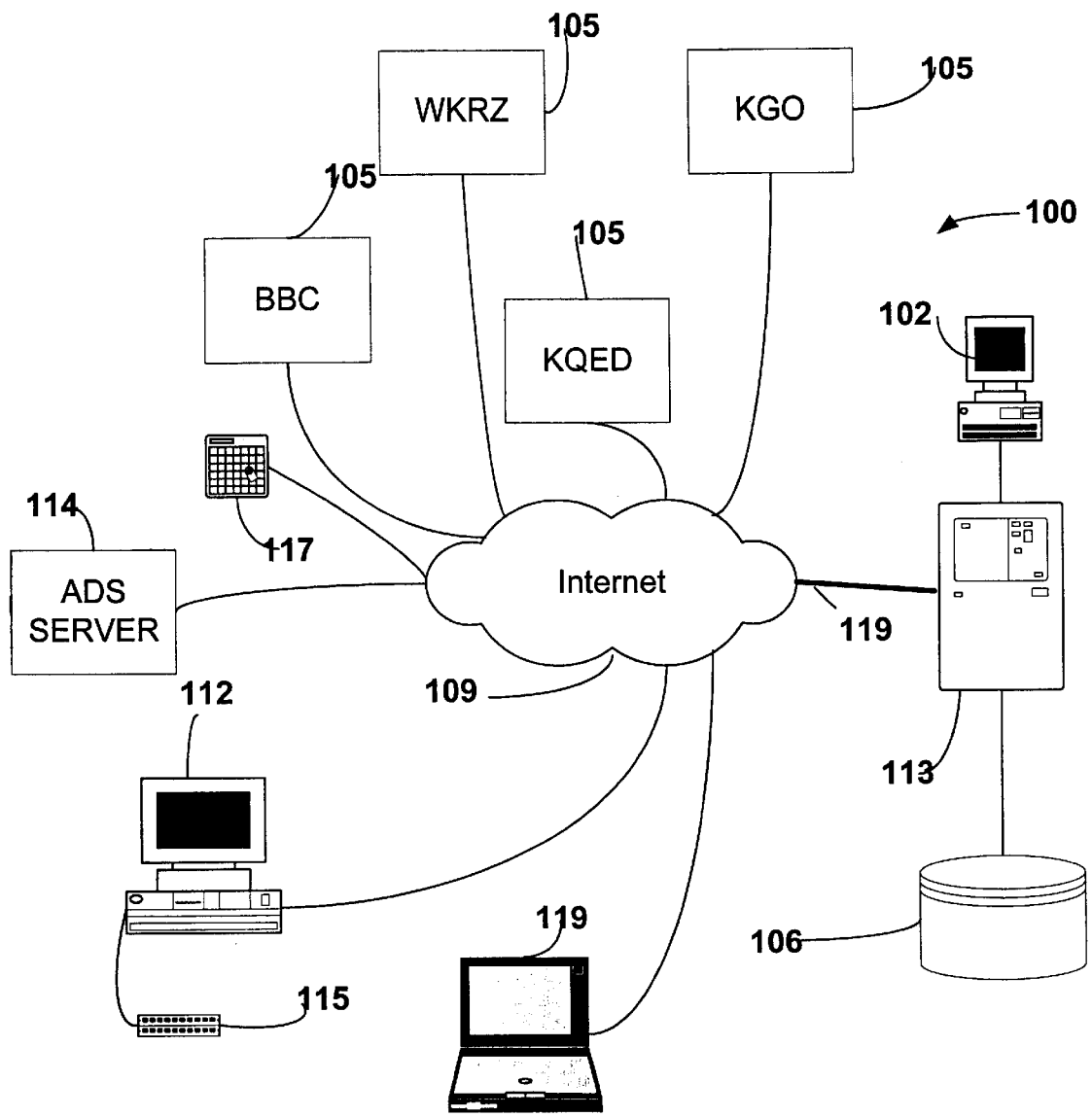
FIG. 1 is a simplified diagram of a network computer system including a tuning server according to an embodiment of the present invention.

FIG. 1 is a simplified diagram of a network computer system 100 according to an embodiment of the present invention. This diagram is merely an example, which should not limit the scope of the claims herein. One of ordinary skill in the art would recognize many other variations, modifications, and alternatives. As shown, the system 100 includes a variety of elements such as a wide area network 109. The wide area network can be, for example, the Internet, an internet, or other type of network, which can include local area networks, intranets, and the like. Connected to the wide area network 109 is an audio tuning server 113, with terminal 102 and database 106. The wide area network allows for communication of other computers such as a client unit 112. Client can be configured with many different hardware components and can be made in many dimensions, styles and locations (e.g., laptop, palmtop, pen, server, workstation and mainframe). As shown, the system includes a lap top computer 119, which is coupled to the Internet, and a remote computing device 117, which is coupled to the Internet in a wireless manner. The remote computing device can include, for example, a cellular phone, a personal digital assistant, a pager, or the like.

The terminal 102 is connected to tuning server 113. This connection can be by a network such as Ethernet, asynchronous transfer mode, IEEE standard 1553 bus, modem connection, universal serial bus, etc. The communication link need not be a wire but can be infrared, radio wave transmission, etc. Server 113 is coupled to the Internet 109. The Internet is shown symbolically as a cloud or a collection of server routers, computers, and other devices 109. The connection to server is typically by a relatively high bandwidth transmission medium such as a T1 or T3 line, but can also be others.

In certain embodiments, the audio tuning server 113 and database 106 store information and disseminate it to client devices over wide area network 109. The concepts of "client" and "server," as used in this application and the industry, are loosely defined and, in fact, are not fixed with respect to machines or software processes executing on the machines. Typically, a server is a machine, e.g., or process that is providing information to another machine or process, i.e., the "client," e.g., that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a WEB site, which is an electronic site commonly on the World Wide Web ("WWW"), is often hosted by a server computer with a large storage capacity, high-speed processor and Internet link having the ability to handle many high-bandwidth communication lines.

In a specific embodiment, the network is also coupled to a plurality of content servers 105, each corresponding to a radio station with call letter, e.g., BBC, WKRZ, KQED, KGO. Each of these servers can be coupled directly to the network or through a client computer, such as client 112. Each of the servers can be similar or can also be different, depending upon the application. Each of the servers is preferably coupled to a radio station, which has a large depository of music and/or audio information, which can be communicated to the Internet and finally to client destinations. Here, the audio information is converted into a digital streaming format for transmission through the wide area network of computers. The audio data, either from an analog feed from the radio station, or from digital audio files is provided through streaming media software. The streaming media software provides the audio data to clients which request a connection to the audio data. The streaming media software sends the encoded audio to the client as a sequence of data packets. The client receives the packets and can decode the packets to then play the audio content. The present invention can utilize a variety of conventional streaming media software. As merely an example, such a tuner is described in U.S. Ser. No. 09/334,846, commonly assigned, and hereby incorporated by reference. Other types of server devices, however, can also be used.

In each of the servers 105, information such as advertisements can be inserted into the streaming audio for output at any one of the client devices. Information can also be inserted into the streaming audio at server 113. Additionally, information such as advertisements can be inserted into the streaming audio from an advertisement server 114, which can store advertisements for use with the streaming audio. The advertisements can be sent using a broadcast model, where the advertisements can be distributed to a group of users. Alternatively, they can be sent to a targeted group of users. Still further, a specific advertisement can be sent to a specific client, where the advertisement is carried by the streaming media. Further details of the processing hardware and software are shown below and illustrated by the Figures.

Figure 2:
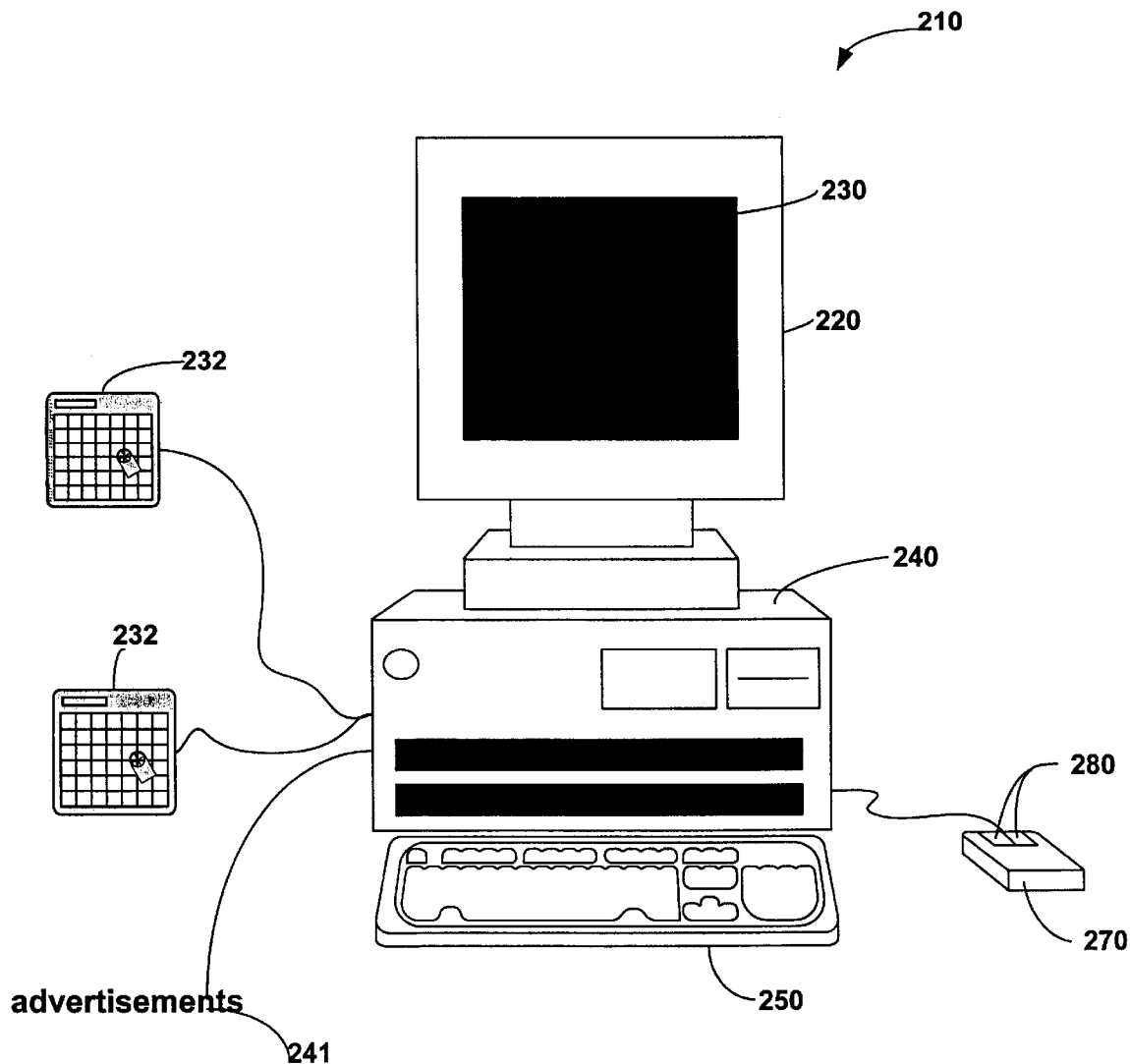
FIGS. 2 and 2A are simplified diagrams of a computing device for processing information according to an embodiment of the present invention.

FIG. 2 is a simplified diagram of a computing device for processing streaming audio information according to an embodiment of the present invention. This diagram is merely an example which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship. FIG. 2 shows computer system 210 including display device 220, display screen 230, cabinet 240, keyboard 250, scanner and mouse 270. Mouse 270 and keyboard 250 are representative "user input devices." Mouse 270 includes buttons 280 for selection of buttons on a graphical user interface device. Other examples of user input devices are a touch screen, light pen, track ball, data glove, microphone, and so forth. The system also has audio output devices or speakers 232, which are each coupled to audio output ports in the computer system. The speakers are also coupled to a sound card, which converts digital audio information into an analog output. FIG. 2 is representative of but one type of system for embodying the present invention. It will be readily apparent to one of ordinary skill in the art that many system types and configurations are suitable for use in conjunction with the present invention. In a preferred embodiment, computer system 210 includes a Pentium™ class based computer, running Windows™ NT operating system by Microsoft Corporation. However, the apparatus is easily adapted to other operating systems and architectures by those of ordinary skill in the art without departing from the scope of the present invention.

As noted, mouse 270 can have one or more buttons such as buttons 280. Cabinet 240 houses familiar computer components such as disk drives, a processor, storage device, etc. Storage devices include, but are not limited to, disk drives, magnetic tape, solid state memory, bubble memory, etc. Cabinet 240 can include additional hardware such as input/output ("I/O") interface cards for connecting computer system 210 to external devices external storage, other computers or additional peripherals, which are further described below.

Figure 2A:
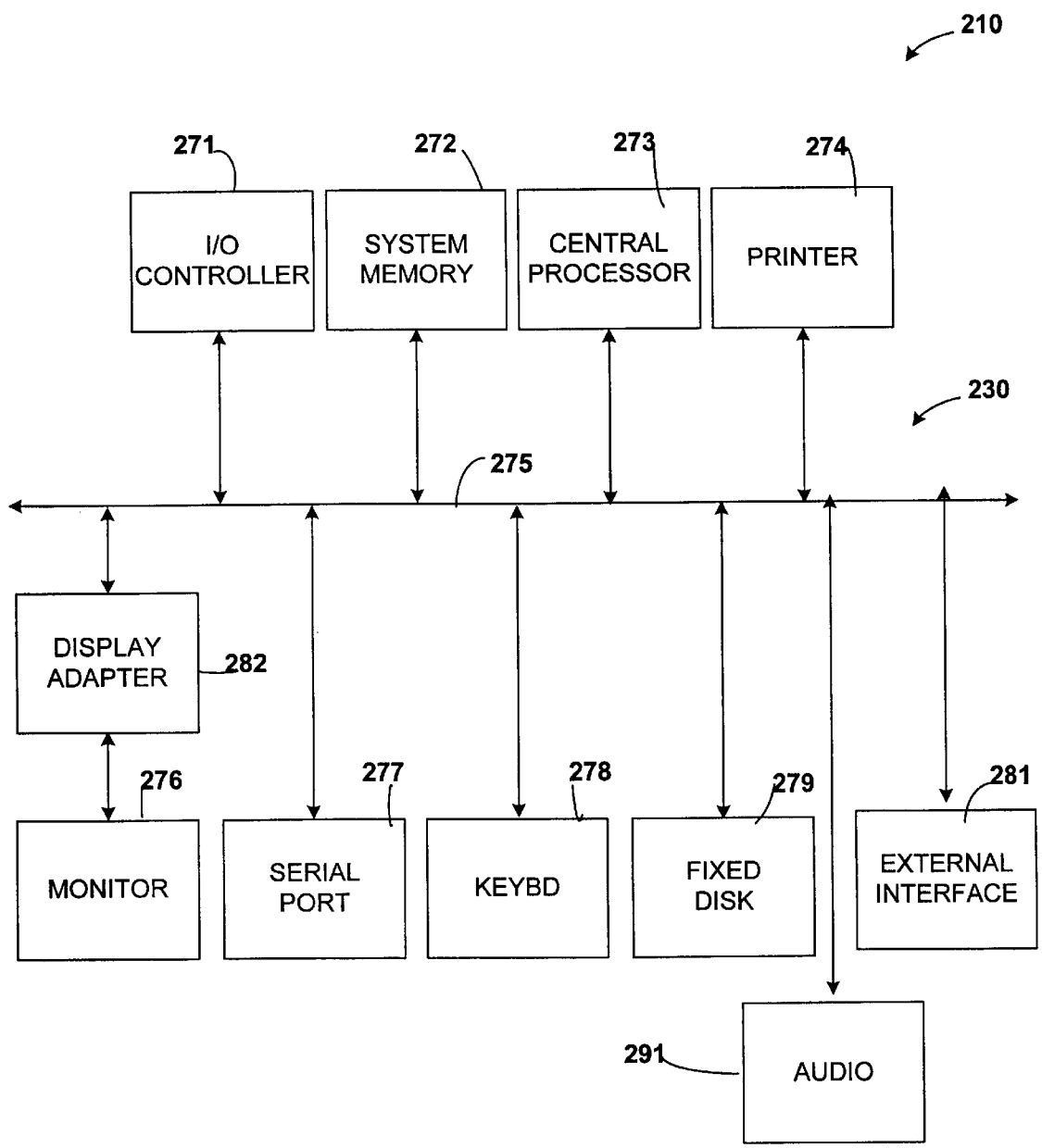

FIG. 2A is an illustration of basic subsystems in computer system 210 of FIG. 2. This diagram is merely an illustration and should not limit the scope of the claims herein. One of ordinary skill in the art will recognize other variations, modifications, and alternatives. In certain embodiments, the subsystems are interconnected via a system bus 275. Additional subsystems such as a printer 274, keyboard 278, fixed disk 279, monitor 276, which is coupled to display adapter 282, and others are shown. Peripherals and input/output ("I/O") devices, which couple to I/O controller 271, can be connected to the computer system by any number of means known in the art, such as serial port 277. For example, serial port 277 can be used to connect the computer system to a modem 281, which in turn connects to a wide area network such as the Internet, a mouse input device, or a scanner. The interconnection via system bus allows central processor 273 to communicate with each subsystem and to control the execution of instructions from system memory 272 or the fixed disk 279, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMs and bar codes, and semiconductor memories such as flash memory, read-only-memories ("ROM"), and battery backed memory. The present invention can also include a tuner for selecting a channel from a plurality of channels. As merely an example, such a tuner is described in U.S. Ser. No. 6,389,463, commonly assigned, and hereby incorporated by reference. The tuner is coupled to audio output device 291, which provides audio signals to speakers. The speakers output audio in the form of, for example, music, etc. The audio output device can be in the form speakers. Other types of tuning devices, however, can also be used.

Although the above has been described in terms of specific hardware features, it would be recognized that there can be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. It is also understood that the examples and embodiments described herein are for illustrative purposes only and that various modifications or changes in light thereof will be suggested to persons skilled in the art and are to be included within the spirit and purview of this application and scope of the appended claims.

A method according to an embodiment of the present invention is briefly described below:

1. Provide first audio data for first song and second audio data for second song at a server location;
2. Provide flag comprising advertisement indication and delay at the server location;
3. Add flag onto first audio data, which is now between the first song and second song at the server location (or other location);
4. Transfer flagged first audio data and second audio data from server location to client location as streaming audio;
5. Select advertisement from a user profile;
6. Transfer advertisement for insertion;
7. Retrieve advertisement from storage;
8. Insert advertisement into streaming audio at the flagged location;
9. Process streaming audio including the advertisement;
10. Output first song through audio output device;
11. Output advertisement through audio output device;
12. Output second song through audio output device; and
13. Perform additional steps, as desired.

These steps show an easy way to insert an advertisement into streaming audio according to the present invention. The steps can be carried out using conventional hardware and selected software. The invention can be provide the user of the client device streaming audio with advertisements inserted between songs, for example. The advertisement can be selected from one of a plurality of storage locations, such as local storage, third party storage, and many others, depending upon the embodiment. In a preferred embodiment, the invention provides for a targeted advertisement to a user. Additionally, these steps are merely examples and should not limit the scope of the claims herein. One of ordinary skill in the art would recognize many other variations, modifications, and alternatives.

Figure 3:
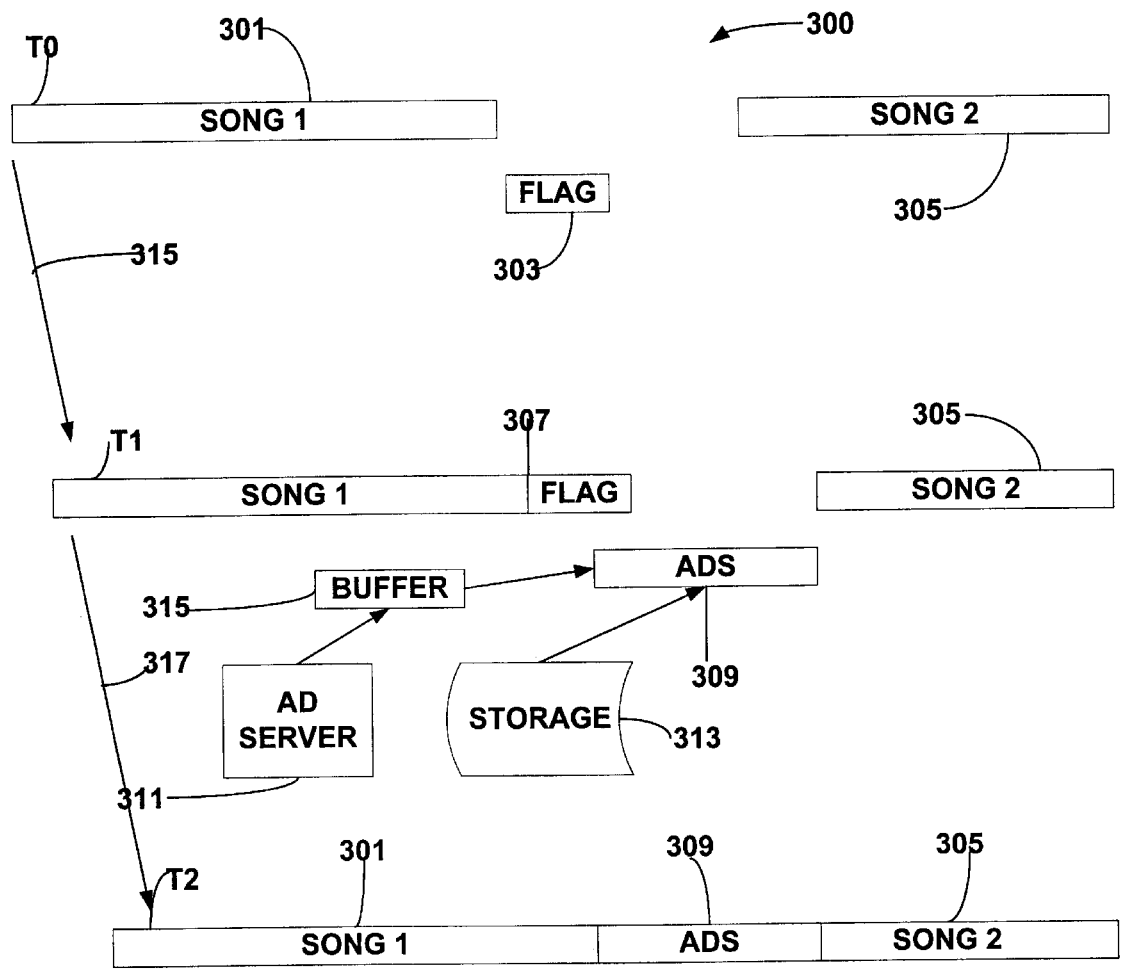
FIGS. 3 and 3A are simplified diagrams of a data insertion method according to an embodiment of the present invention.

FIG. 3 is a simplified diagram of a data insertion method 300 according to an embodiment of the present invention. This diagram is merely an example which should not unduly limit the scope of the claims herein. One of ordinary skill in the art would recognize many other variations, modifications, and alternatives. At a server location, the method 300 provides first audio data for a first song 301 and second audio data for a second song 305. The first audio data is provided at time $T_0$, which is an initial or zero time, as given only for reference purposes. As shown, the method also provides a flag comprising advertisement indication and delay at the server location. The flag is data that indicates where an advertisement is to be inserted. The flag often has other information such as the length of the advertisement, current content type (e.g. music/talk), and current ad frequency on this stream (e.g. 2 per hour).

As noted, the advertisement can come from one of the plurality of content servers, each corresponding to a radio station with call letter, e.g., BBC, WKRZ, KQED, KGO. Each of these servers can be coupled directly to the network or through a client computer. Each of the servers can be similar or can also be different, depending upon the application. Each of the servers is preferably coupled to a radio station, which has a large depository of music and/or audio information, which can be communicated to the Internet and finally to client destinations. Here, the audio information is converted into a digital streaming format for transmission through the wide area network of computers. The audio data, either from an analog feed from the radio station, or from digital audio files is provided through streaming media software. The streaming media software provides the audio data to clients which request a connection to the audio data. The streaming media software sends the encoded audio to the client as a sequence of data packets. The client receives the packets and can decode the packets to then play the audio content, as noted.

Next, the method adds the flag 303 onto first audio data, which is now between the first song and second song at the server location (or other location). Here, the flag can be provided at the radio station server location. Alternatively, the flag can be provided at a tuning server location or other locations. In most embodiments, the flag is provided onto the first audio data at first time $T_1$, where $T_1 > T_0$, which signifies a delay 315 between the initial time and the first time. The delay can be caused by a variety of factors such as latency in the network or the like. In some embodiments, the method transfer the flagged first audio data and second audio data from server location to client location as streaming audio. In some other embodiments, the first audio data and the second audio data are transferred to a server for insertion of advertisements.

The method retrieves an advertisement 309 from storage. Here, the advertisement can be retrieved from location storage 313, which can be at the client location. Alternatively, the advertisement can be retrieved from an advertising server or other third party server 311. In some embodiments, the method may buffer 315 the advertisement and then provide it for insertion into the streaming audio. The method monitors the streaming audio for the flag 307. Once the flag has been found, the method inserts the advertisement between the first audio data and the second audio data. The streaming audio data is now ready for output at an audio output device, which is coupled to the client device. Depending upon the form of the streaming audio, the method can process streaming audio including the advertisement to make it suitable for output. Many conventional techniques can be used for converting the streaming audio into an analog signal for output on a conventional speaker, for example.

Next, the method outputs the first song through audio output device. The method output the advertisement through audio output device; and the method output the second song through audio output device. As shown, the first song is outputted at second time $T_2$, where $T_2 > T_0$, which signifies a delay 317 between the first time and the second time. The delay can be caused by a variety of factors such as latency in the network or the like. The delay also can be selectively caused by way of a buffer or cache and the like. As shown, the streaming audio, which is output, includes first song 301, advertisement 309, and second song 305, which is output in a continuous manner. Depending upon the embodiment, the method continues to perform additional steps, as desired, or even repeats previous steps.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

Figure 3A:
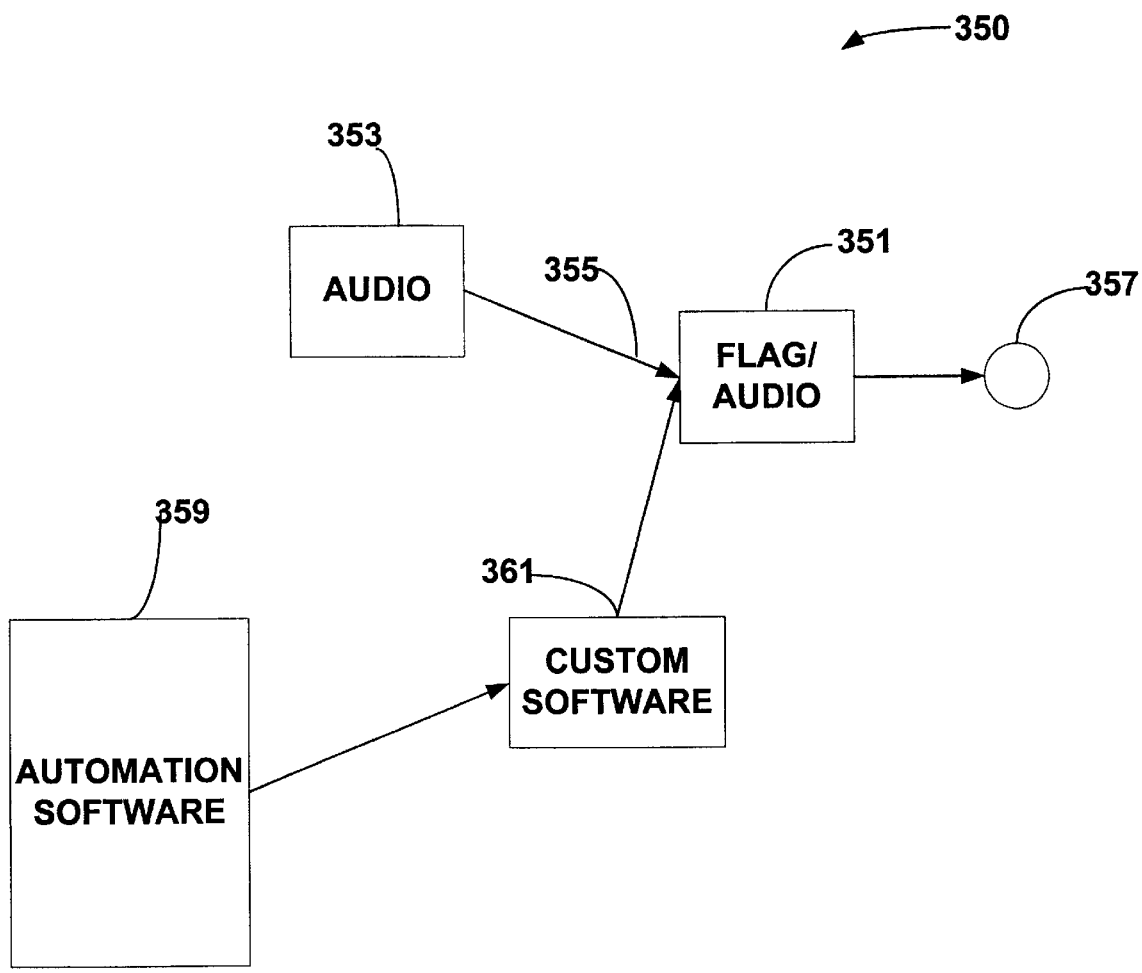
Figure 4:
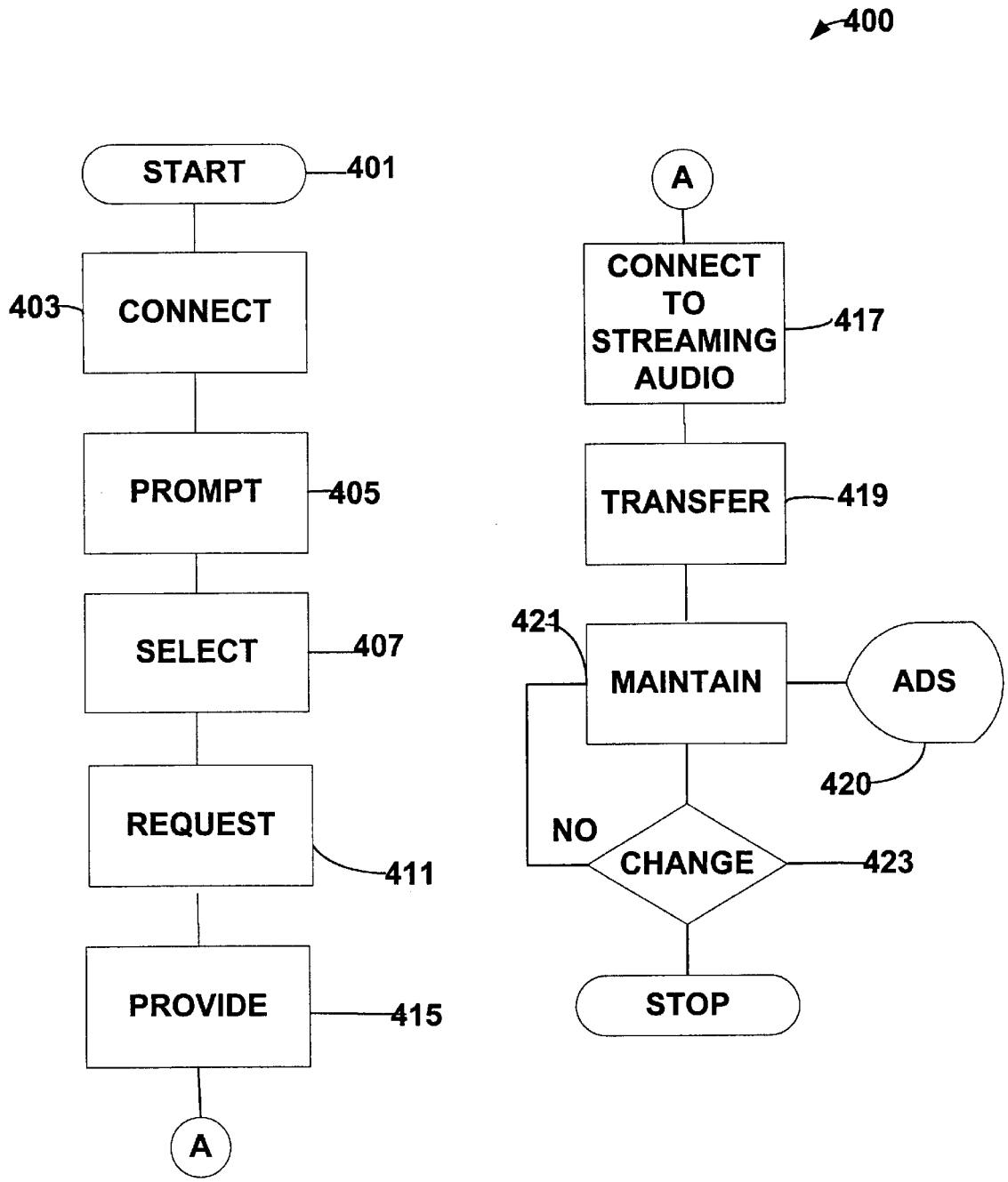
FIG. 4 is a simplified diagram of a data insertion method according to an alternative embodiment of the present invention.

FIG. 3A is a simplified block diagram 350 of elements for providing streaming audio including a flag according to an embodiment of the present invention. This diagram is merely an example which should not unduly limit the scope of the claims herein. One of ordinary skill in the art would recognize many other variations, modifications, and alternatives. The block diagram often represents processes at the server side, which provides streaming audio and a flag indication for inserting an advertisement. The block diagram shows an audio source 353, which is often a large storage device for archiving music, video, or other content. The storage device can be a plurality of hard drives or disks. Alternatively, it can be in a database format. The audio source provides via branch 355 audio in the form of audio data, which includes a first song (corresponding to first audio data), a second song (corresponding to second audio data), etc. Automation software 359 is also provided, as shown.

The automation software can be any suitable software for organizing station programming. In some embodiments, the automation software can also include scheduling features, which can also be separated from such software. Here, the scheduling software maintains a daily program and the automation software plays all the audio coming from the station except for the live voice segments, which are provided manually. The present method provides an insertion technique. The insertion technique often uses the scheduler and the automation software in one embodiment. The method drops a labeled "empty" clip into the scheduler preceding ads targeted for replacement. The clip would have a title like SBX-C-30 to mark a thirty ("30")second commercial, for example. Here, the SBX refers to vendor (e.g. Sonicbox), C refers to commercial spot, and 30 refers to thirty seconds. The automation software outputs a real time log file (sometimes known as a Billboard file) somewhere on an intranet in the radio station, for example, and preferably on an encoder machine. The file is often updated synchronous with the change in clip name. Alternatively, the automation software can provide some programmatic interface through which the present custom event software can receive information via a custom input filter plug-in.

The custom software can insert the flag (step 351) at selected locations on the streaming audio. In one embodiment, the flag is inserted after the first song location, but before the location of the advertisement. The flag can be digital, an analog tone, or a watermark according to the embodiment. The flag can also be inserted or distributed through the location of the advertisement. The flag is often before the second song location. The streaming audio, including first audio data and second audio data, and flag is now ready for streaming over to a client or other server through the network. Once the scheduler software has the flags in the play list and the automation software is making the log file available on the network, the flags must be translated into data which can be sent in the encoded audio stream.

In a specific embodiment, the custom event software actively polls the log file and looks for ad insertion flags and song titles. When a flag is found, the software interfaces to the encoder software to insert the flag into the stream in a way that is compatible with the stream type. It would be recognized that the present method can accommodate different encoding formats and different automation packages, depending upon the embodiment. As merely an example, the present custom software supports Microsoft NetShow encoders and will run on the encoder PC at the station to insert a custom SendEvent script into the audio stream whenever the name changes in the log file. Here, the software and resulting method provides full song title information in audio format. Other embodiments can also support MP3 and Real Audio formats.

Next, the method transfers the streaming audio with flag to the network, step 357. The network can be a local area network, an internet, an intranet, or the Internet. The streaming audio is transferred to the tuning server, which directs the audio to a client for output. In these embodiments, the tuning server can insert the advertisement. Alternatively, the client can also insert the advertisement. Still further the streaming audio with flag can be sent to the client, which inserts the advertisement. Alternatively, a third party server, including the tuning server, can insert the advertisement. These and other embodiments will be recognized by one of ordinary skill in the art.

In a specific embodiment, the customized software also provides for targeted advertisements based upon a user profile. Here, the software recognizes a unique identification number (ID) on the server and an associated demographic. The demographic is built from volunteered information and from monitoring of user listening patterns. When the streaming audio begins, the software checks for the most recent list of advertisement sequences available for that user. The list of sequences is generated by first matching the user demographic with the currently running advertisement sequences, for example. The software also checks to see how many times each advertisement has been heard by the user. The information is summarized in an available advertisement list that contains the relevant ad sequences, their associated audio tracks, and the number of times each track can still be heard by this listener before they expire.

For stations which do not have digital advertisement insertion capability (analog stations or stations without clips), the software flags the client to inform if, for example, the software can insert a "fade" advertisement, which is an advertisement added over music, where the music is faded, at specified intervals and top of the hour sponsorships. In this embodiment, ad sequences can be sold to targeted demographics over a fixed period of time with guarantees that the advertisements will be heard in order with hard limits on the number of times a particular user will hear a particular advertisement.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

A method according to an embodiment of the present invention can be briefly outlined as follows:

1. Connect client (e.g., personal computer, cellular phone, personal digital assistant, work station, television set top box, pager, internet radio, an internet appliance) to tuning server, which is coupled to a world wide area of computers;
2. Optionally, prompt and display indication on a first display portion of the client to user for a station;
3. Select indication directed to a certain station from the client;
4. Request connection for the certain station from the client to the tuning server through the network;
5. Redirect connection from the tuning server to a URL for an audio stream of the certain station at the radio station server;
6. Transfer audio stream from the radio station server to the client to play audio stream on audio output device;
7. Provide first audio data for first song and second audio data for second song at the server location;
8. Provide flag comprising advertisement indication and delay at the server location (or use time or top of hour configuration to decide location of advertisement);
9. Add flag onto first audio data, which is now between the first song and second song at the server location (or other location);
10. Transfer flagged first audio data and second audio data from server location to client location as streaming audio;
11. Retrieve advertisement from storage based upon a user profile;
12. Insert advertisement into streaming audio at the flagged location (or at a specific time or top of hour);
13. Process streaming audio including the advertisement;
14. Output first song, advertisement, and second song through audio output device; and
15. Perform other steps, as desirable.

These steps show an easy way to insert an advertisement into streaming audio according to the present invention. The steps can be carried out using conventional hardware and selected software. The invention can be provide the user of the client device streaming audio with advertisements inserted between songs, for example. The advertisement can be selected from one of a plurality of storage locations, such as local storage, third party storage, and many others, depending upon the embodiment. In preferred embodiments, the method provides for targeted advertisement to a user. Additionally, these steps are merely examples and should not limit the scope of the claims herein. One of ordinary skill in the art would recognize many other variations, modifications, and alternatives.

As shown, the method 400 begins at start, step 401. Here, the user of the method begins at a client device, such as the one noted above, as well as others. The method generally uses such a client device with a browsing device, which is used to interface through a world wide network of computers to a server device, called the tuning server in the present embodiment. The client can be a personal computer, cellular phone, personal digital assistant, work station, television set top box, pager, internet radio, an internet appliance, or the like. The client connects (step 403) to the tuning server, which is also coupled to a world wide area of computers. The network is an internet or the Internet or the like. Once the connection is made, which is commonly a TCP type connection, the method prompts (step 405) and displays and indication on a first display portion of the client to user for a radio station to be selected. Here, the client device often includes software such as the IM™ Tuner made by SonicBox, Inc. or the like, but can be others.

The client device prompts a menu to select an indication directed to a certain station. As merely an example, the menu can be one that is similar to the previously noted, but can be others. The user selects (step 407) the station by clicking on an indication directed to the station. The client device receives the selection and requests (step 411) for a connection for the selected station from the client to the tuning server through the network. The request often traverses through the network using packetized communication to the tuning server, which receives the request. The tuning server can be similar to the one noted above, but can be others.

The tuning server is a often a suitable computer connected to a local or worldwide network of computers. It maintains databases some of which contain various relevant information relating to internet radio stations and internet radio listeners. The tuning server may also compile statistics and/or add data to databases relating to user activity and requests. The tuning server also responds to requests made by the client for information. There are many possible implementations of the tuning server and client such that the server can provide information to the client on request.

The tuning server receives the request from the client. The tuning server matches the request to a URL, which defines the station. In a specific embodiment, the tuning server uses a look up table, such as the one noted to find the station. The tuning server finds the URL receives the client's request and redirects (step 415) the client to the URL for an audio stream of the selected station at the radio station server. The radio station server is connected (step 417) to the tuning server. The radio station server receives the request and transfers (step 419) the audio stream from the radio station server to the client.

The method continues to monitor the client for a change, step 423. Here, the client can change channels, stop the streaming audio transmission, and perform other functions, as well. If no change on the station is present, the method continues to maintain, step 421, and streaming audio continues to output on the client device. Alternatively, if a change is detected the method goes back to step 407, where the user selects another channel corresponding to a different radio station. Alternatively, if a change is not detected and if the user decides to stop transmission of the streaming audio, the method stops, which releases the connection between the client and the radio station server.

In a preferred embodiment, the method monitors the streaming audio for a flag, which signifies that an advertisement is to be inserted. If the method finds the flag, the advertisement is inserted, and then played out (step 420) through the audio output device. In a specific embodiment, the method uses an insertion technique such as the one noted above, but can be others. In a preferred alternative embodiment, the method monitors for a selected time to insert the advertisement. Here, the advertisement is not inserted into a delay or free spot in the streaming audio. The method finds a desired time, such as top of hour (e.g., 1:00 p.m., 2:00 p.m.) or half and hour, and outputs an advertisement at such time. The method can also insert the advertisement at a selected song or other indication, which is not a flag, in particular, The method adds the advertisement information in audio form on top of the streaming audio, which may be a song. In particular, the method reduces a volume intensity of the streaming audio and places the advertisement on top of the streaming audio, where the intensity of the advertisement covers up the streaming audio. In preferred embodiments, the streaming audio has faded and appears as background noise, where the listener to hear and understand the advertisement simultaneously with the streaming audio as background noise. Details of an insertion method are provided below according to the Figure. This sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

Figure 5:
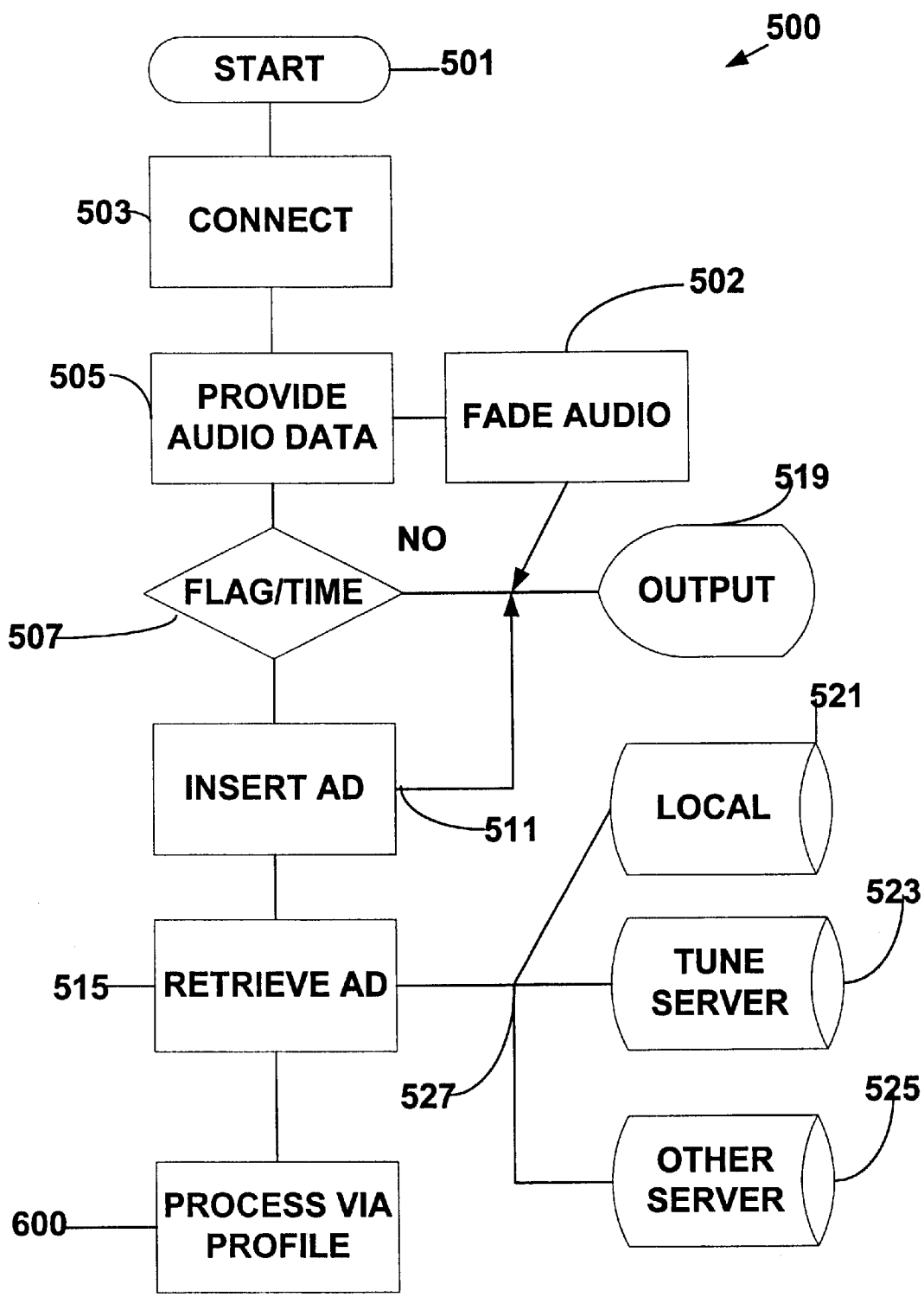
FIGS. 5, 5A, and 5B are simplified diagrams of data insertion methods according to yet other alternative embodiments of the present invention.

FIG. 5 is a simplified diagram of a data insertion method 500 according to an alternative embodiment of the present invention. This diagram is merely an example which should not unduly limit the scope of the claims herein. One of ordinary skill in the art would recognize many other variations, modifications, and alternatives. The method begins at start, step 501. FIG. 5 is a simplified diagram of a data insertion method 500 according to yet an alternative embodiment of the present invention. This diagram is merely an example which should not unduly limit the scope of the claims herein. One of ordinary skill in the art would recognize many other variations, modifications, and alternatives. Here, the user of the method begins at a client device, such as the one noted above, as well as others. The method generally uses such a client device with a browsing device, which is used to interface through a world wide network of computers to a server device, called the tuning server in the present embodiment. The client can be a personal computer, cellular phone, personal digital assistant, work station, television set top box, pager, internet radio, an internet appliance, or the like. The client connects (step 503) to the tuning server, which is also coupled to a world wide area of computers. The network is an internet or the Internet or the like. Once the connection is made, which is commonly a TCP type connection, the method goes onto the next step. Here, the client device often includes software such as the IM™ Tuner made by SonicBox, Inc. or the like, but can be others.

Once the connection is made, streaming audio (step 505) is provided. Here, the streaming audio can be provided from one of a plurality of audio content sources. Each radio station server may include a call letter, e.g., BBC, WKRZ, KQED, KGO. Each of these servers can be coupled directly to the network or through a client computer. Each of the servers can be similar or can also be different, depending upon the application. Each of the servers is preferably coupled to a radio station, which has a large depository of music and/or audio information, which can be communicated to the Internet and finally to client destinations. Here, the audio information is converted into a digital streaming format for transmission through the wide area network of computers. The audio data, either from an analog feed from the radio station, or from digital audio files is provided through streaming media software. The streaming media software provides the audio data to clients which request a connection to the audio data. The streaming media software sends the encoded audio to the client as a sequence of data packets. The client receives the packets and can decode the packets to then play the audio content.

At one or more of these radio station server locations, the method provides first audio data for a first song and second audio data for a second song. The first audio data is provided at time $T_0$, which is an initial or zero time, as given only for reference purposes. The method also provides a flag comprising advertisement indication and delay at the server location. The flag is data that indicates where an advertisement is to be inserted. The flag often has other information such as the length of the advertisement, current content type (e.g. music/talk), and current ad frequency on this stream (e.g. 2 per hour).

Next, the method adds the flag onto first audio data, which is now between the first song and second song at the server location (or other location). Here, the flag can be provided at the radio station server location. Alternatively, the flag can be provided at a tuning server location or other locations. In most embodiments, the flag is provided onto the first audio data at first time $T_1$, where $T_1>T_0$, which signifies a delay between the initial time and the first time. The delay can be caused by a variety of factors such as latency in the network or the like. In some embodiments, the method transfer the flagged first audio data and second audio data from server location to client location as streaming audio. In some other embodiments, the first audio data and the second audio data are transferred to a server for insertion of advertisements at a client location.

Next, the method retrieves an advertisement 515 from storage 527. Here, the advertisement can be retrieved from location storage 521, which can be at the client location. Alternatively, the advertisement can be retrieved from an advertising server or other third party server 525. Alternatively, the advertisement can be retrieved from the tuning server 523. The method monitors (step 507) the streaming audio for the flag. Once the flag has been found, the method inserts (step 511) the advertisement between the first audio data and the second audio data. The streaming audio data is now ready for output at an audio output device, which is coupled to the client device. Depending upon the form of the streaming audio, the method can process streaming audio including the advertisement to make it suitable for output. Many conventional techniques can be used for converting the streaming audio into an analog signal for output on a conventional speaker, for example.

In a preferred alternative embodiment, the method monitors (step 507) for a selected time to insert the advertisement. Here, the advertisement is not inserted into a delay or free spot in the streaming audio. The method finds a desired time, such as top of hour (e.g., 1:00 p.m., 2:00 p.m.) or half and hour, and outputs an advertisement at such time. The method can also insert the advertisement at a selected song or other indication, which is not a flag, in particular, The method adds the advertisement information in audio form on top of the streaming audio, which may be a song. In particular, the method reduces a volume intensity of the streaming audio and places the advertisement on top of the streaming audio, where the intensity of the advertisement covers up the streaming audio. In preferred embodiments, the streaming audio has faded and appears as background noise, where the listener to hear and understand the advertisement simultaneously with the streaming audio as background noise.

Figure 5A:
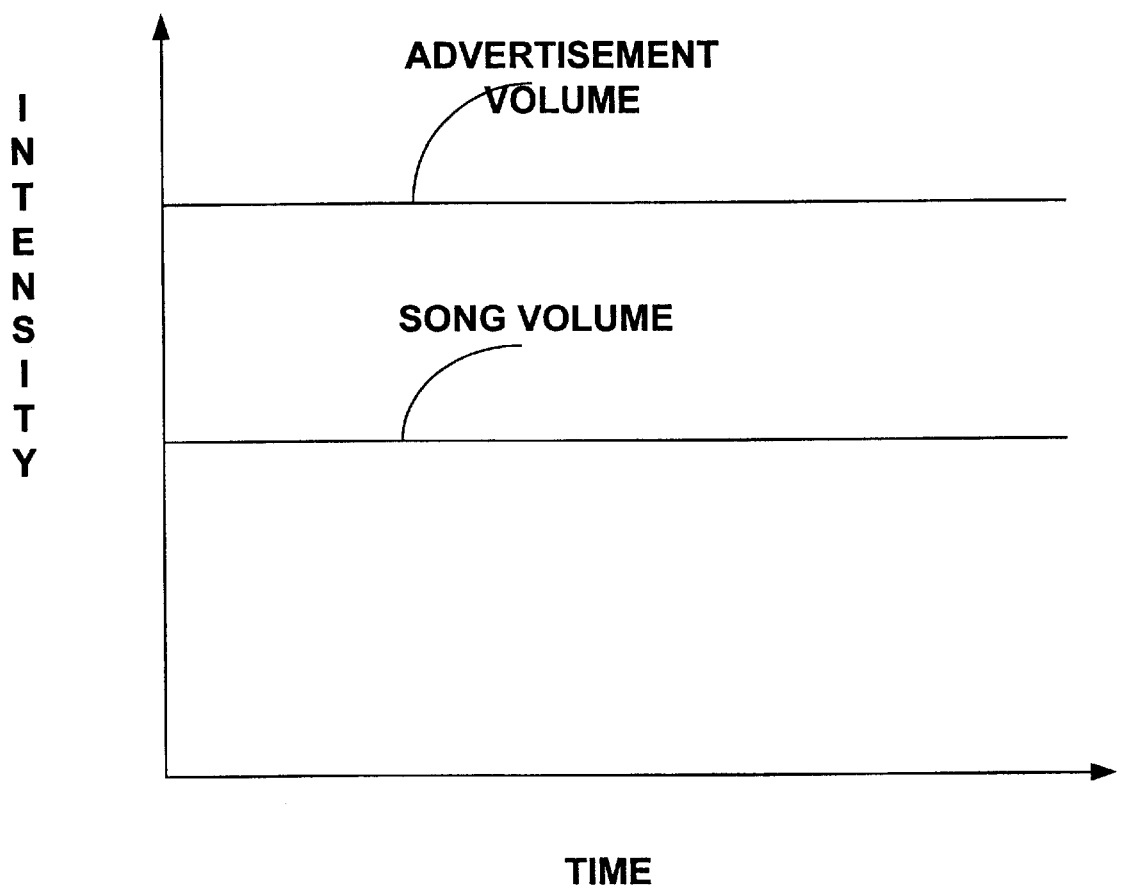

As merely an example, FIG. 5A shows a simplified diagram of volume intensity of the advertisement in comparison to the song as measured against time. The vertical axis is intensity and the horizontal axis is time. As shown, the advertisement volume intensity is greater than the song volume intensity. In some cases the volume intensity of the advertisement is at least 50% greater or 100% greater or some other percentage, which allows the user to hear and understand the advertisement over the song. The diagram is merely an example, which should not unduly limit the scope of the claims herein.

Next, the method outputs (step 519) the first song through audio output device. The method output the advertisement through audio output device; and the method output the second song through audio output device. Often times, the first song is outputted at second time $T_2$, where $T_2>T_1$, which signifies a delay between the first time and the second time. The delay can be caused by a variety of factors such as latency in the network or the like. The delay also can be selectively caused by way of a buffer or cache and the like. The streaming audio, which is output, includes first song, advertisement, and second song, which is output in a continuous manner. Depending upon the embodiment, the method continues to perform additional steps, as desired, or even repeats previous steps.

In a specific embodiment, the method retrieves the advertisement, which has been selected based upon a user profile (step 600). The user profile can include information derived from a user registration process. The user registration process can derive information such as, for example, sex, age, hobbies, geographic region, race, religion, health, and sexual orientation. Other information can also be derived from the stations being selected as well as use of such stations during the time of day, for example. The user profile information can also include any other information which can be used to provide a more desirable advertisement or information to the user. Since the user is at a specific client location, the advertisement can be targeted to the user. Details of such user profile process is provided below.

Figure 5B:
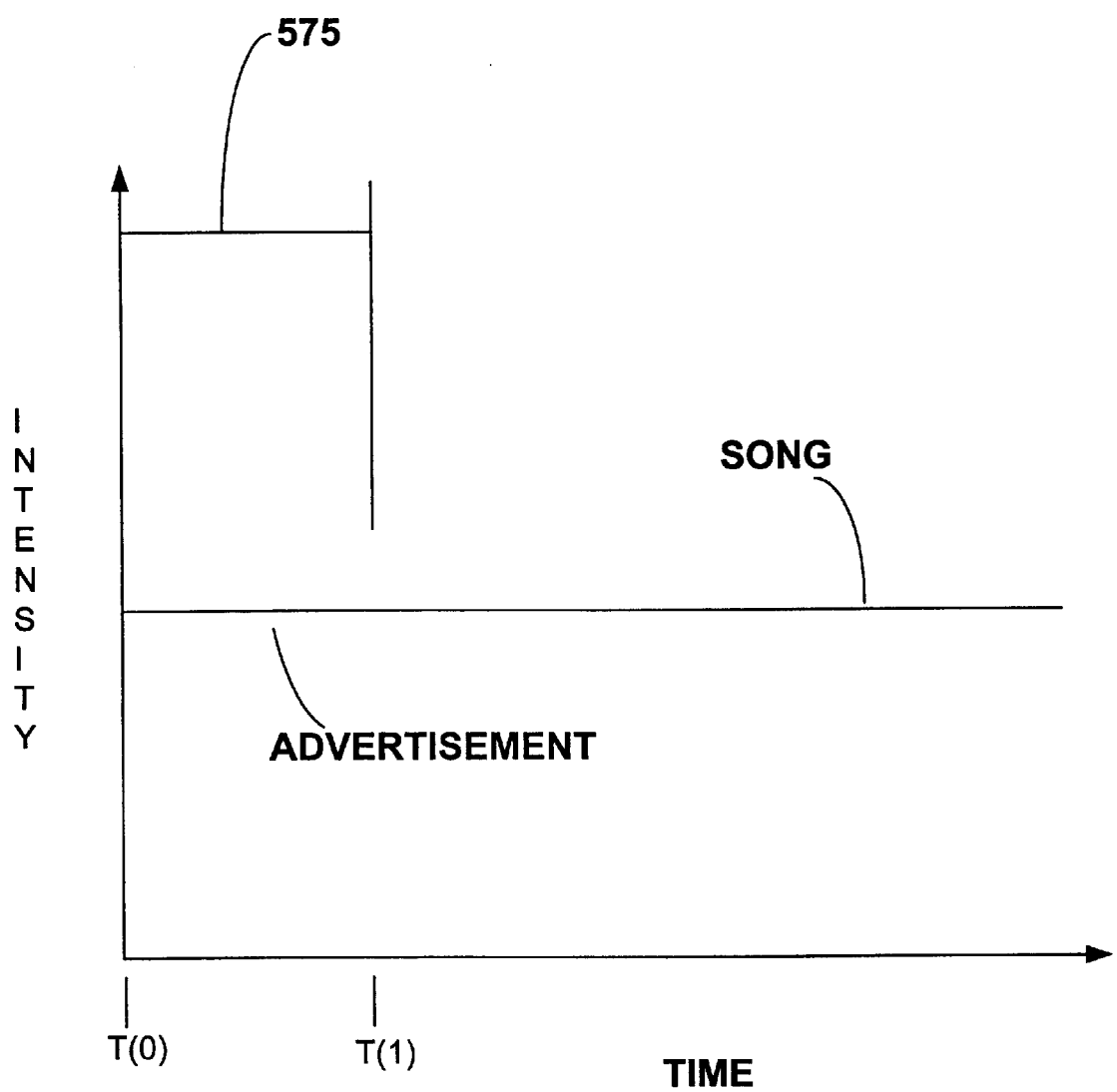

In still an alternative embodiment, the present method provides for an advertisement insertion, such as the one noted above, during a buffer time, which is shown in the simplified diagram of FIG. 5B. Here, a user turns on the audio device and switches onto a station. Since there is delay in the network, a certain buffer time 575 conventionally exists. As shown, the vertical axis represents intensity and the horizontal axis, which intersects the vertical axis, represents time. The buffer time is "dead time" where no audio is outputted on the audio output device. The user often waits and listens to a "hiss" sound or the like. During the buffer time, which occurs in conventional techniques, the present method inserts an advertisement, which is between T(0) and (T1). The method can calculate the difference between T(0)

and (T)1) and find an advertisement (as shown) with a similar time (but may be different) to insert at the beginning of the listening session, but before the song (also as shown). Accordingly, the present invention can be used at the beginning of any audio session for audio streaming at a client location.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

Figure 6:
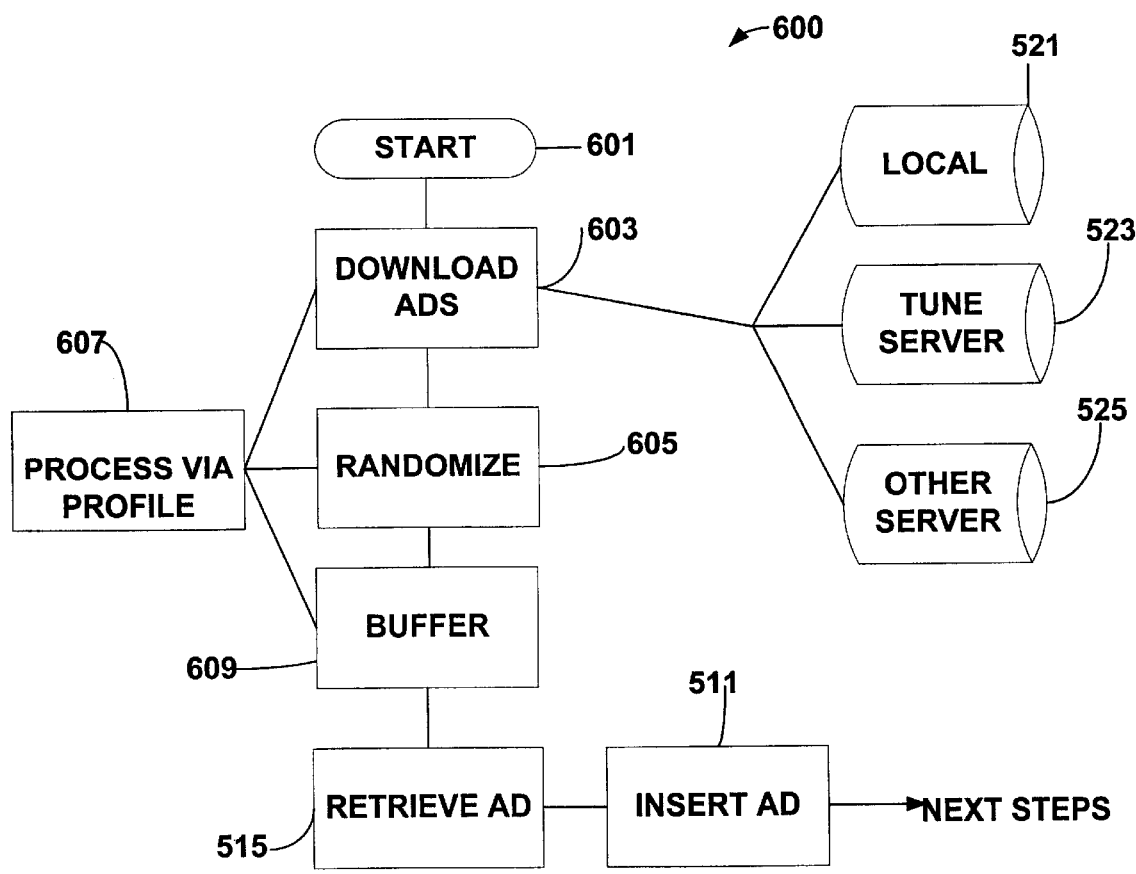
FIG. 6 is a simplified diagram of a method for selecting an advertisement for streaming audio according to an embodiment of the present invention

FIG. 6 is a simplified diagram of a method 600 for selecting an advertisement for streaming audio according to an embodiment of the present invention. This diagram is merely an example, which should not unduly limit the scope of the claims herein. One of ordinary skill in the art would recognize many other variations, alternatives, and modifications. Like reference numerals are used in this Figure. as the previous Figure. for easy cross referencing, but are not intended to be limiting. As shown, the method begins at start, step 601. The method downloads a plurality of advertisements, which have been stored in memory. Here, the advertisement can be retrieved from location storage 521, which can be at the client location. Alternatively, the advertisement can be retrieved from an advertising server or other third party server 525. Alternatively, the advertisement can be retrieved from the tuning server 523.

In some embodiments, the advertisements are selected based upon a user profile (step 607). The user profile can include information derived from a user registration process. The user registration process can derive information such as, for example, sex, age, hobbies, geographic region, race, religion, health, and sexual orientation. Other information can also be derived from the stations being selected as well as use of such stations during the time of day, for example. The user profile information can also include any other information which can be used to provide a more desirable advertisement or information to the user. The user profile is used to query memory and retrieve advertisements that match or should be desirable to the user.

Once the desired advertisements have been downloaded, the method randomizes (step 605) the advertisements to select one of the advertisements for output. Here, the method can use a random number generator approach to select the advertisement. Alternatively, the method can select the advertisement based upon other information in the user profile, step 607. For example, the selected advertisement can be desirable for outputting at a selected time of day, e.g., morning, night, afternoon. The advertisement is then outputted to an audio stream process, step 509, which could hold the advertisement in a buffer. Next, the method retrieves the advertisement (step 515) from buffer, and inserts (step 511) the advertisement into the streaming audio.

Here, the method monitors the streaming audio for the flag. Once the flag has been found, the method inserts the advertisement between the first audio data and the second audio data. The streaming audio data is now ready for output at an audio output device, which is coupled to the client device. Depending upon the form of the streaming audio, the method can process streaming audio including the advertisement to make it suitable for output. Many conventional techniques can be used for converting the streaming audio into an analog signal for output on a conventional speaker, for example.

Next, the method outputs the first song through audio output device. The method output the advertisement through audio output device; and the method output the second song through audio output device. Often times, the first song is outputted at second time $T_2$, where $T_2 > T_1$, which signifies a delay between the first time and the second time. The delay can be caused by a variety of factors such as latency in the network or the like. The delay also can be selectively caused by way of a buffer or cache and the like. The streaming audio, which is output, includes first song, advertisement, and second song, which is output in a continuous manner. Depending upon the embodiment, the method continues to perform additional steps, as desired, or even repeats previous steps.

In a preferred alternative embodiment, the method monitors for a selected time to insert the advertisement, which is based upon the user profile. Here, the advertisement is not inserted into a delay or free spot in the streaming audio. The method finds a desired time, such as top of hour (e.g., 1:00 p.m., 2:00 p.m.) or half and hour, and outputs an advertisement at such time. The method can also insert the advertisement at a selected song or other indication, which is not a flag, in particular, The method adds the advertisement information in audio form on top of the streaming audio, which may be a song. In particular, the method reduces a volume intensity of the streaming audio and places the advertisement on top of the streaming audio, where the intensity of the advertisement covers up the streaming audio. In preferred embodiments, the streaming audio has faded and appears as background noise, where the listener to hear and understand the advertisement simultaneously with the streaming audio as background noise.

Although the above has been described in terms of specific hardware features, it would be recognized that there can be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. It is also understood that the examples and embodiments described herein are for illustrative purposes only and that various modifications or changes in light thereof will be suggested to persons skilled in the art and are to be included within the spirit and purview of this application and scope of the appended claims.

It is also understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

The above sequence of steps is merely illustrative. The steps can be performed using computer software or hardware or a combination of hardware and software. Any of the above steps can also be separated or be combined, depending upon the embodiment. In some cases, the steps can also be changed in order without limiting the scope of the invention claimed herein. One of ordinary skill in the art would recognize many other variations, modifications, and alternatives. The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for inserting advertisements into streaming audio for transmission over a world wide network of computers, the method comprising:

transmitting audio data from a first server location to a client location through a wide area network; and inserting an advertisement into the audio data while simultaneously reducing an audio volume level of the audio data and simultaneously outputting the audio data and the advertisement where an advertisement volume level is selected for a user to hear the advertisement while playing the audio data in a song format as background noise;

wherein the advertisement, which is one of a plurality of advertisements, is based upon a user profile to provide a targeted advertisement to the user.

2. The method of claim 1 wherein the audio volume level is one half of the advertisement volume level.

3. The method of claim 1 wherein the advertisement is derived from a local storage, a second server, and a first server.

4. The method of claim 1 wherein the user profile comprises station information.

5. The method of claim 4 wherein the user profile is based upon the client device.

6. The method of claim 1 wherein the user profile is based upon a channel.

7. The method of claim 1 wherein the client location comprises a client, the client being selected from a computer, an Internet radio device, an Internet appliance, a personal digital assistant, and a cellular phone.

8. The method of claim 1 wherein the adjustment of the audio volume level is provided by a mixer device.

9. The method of claim 1 wherein the world wide network of computers comprises an internet or the Internet.

10. The method of claim 1 wherein the outputting is provided on a speaker.

11. A system for inserting a targeted advertisement into streaming audio, the system comprising a memory or memories including;

a code directed to transmitting audio data from a first server location to a client location through a wide area network;

a code directed to inserting an advertisement into the audio data while simultaneously reducing an audio volume level of the audio data and simultaneously outputting the audio data and the advertisement where an advertisement volume level is selected for a user to hear the advertisement while playing the audio data in a song format as background noise.

12. The system of claim 11 wherein the code directed to inserting reside in memory at the client location.

13. The system of claim 11 wherein the code directed to transmitting audio data residing in memory at the first server location.

14. The system of claim 11 wherein the advertisement, which is one of a plurality of advertisements, is based upon a user profile to provide a targeted advertisement to the user.

* * * * *